(No Model.) 2 Sheets—Sheet 1.
T. P. KING.
CLOTHES LINE SUPPORT.

No. 583,486. Patented June 1, 1897.

WITNESSES:
William Goebel.
F. S. Kennedy.

INVENTOR,
Thomas P. King
BY George Cook
ATTORNEY.

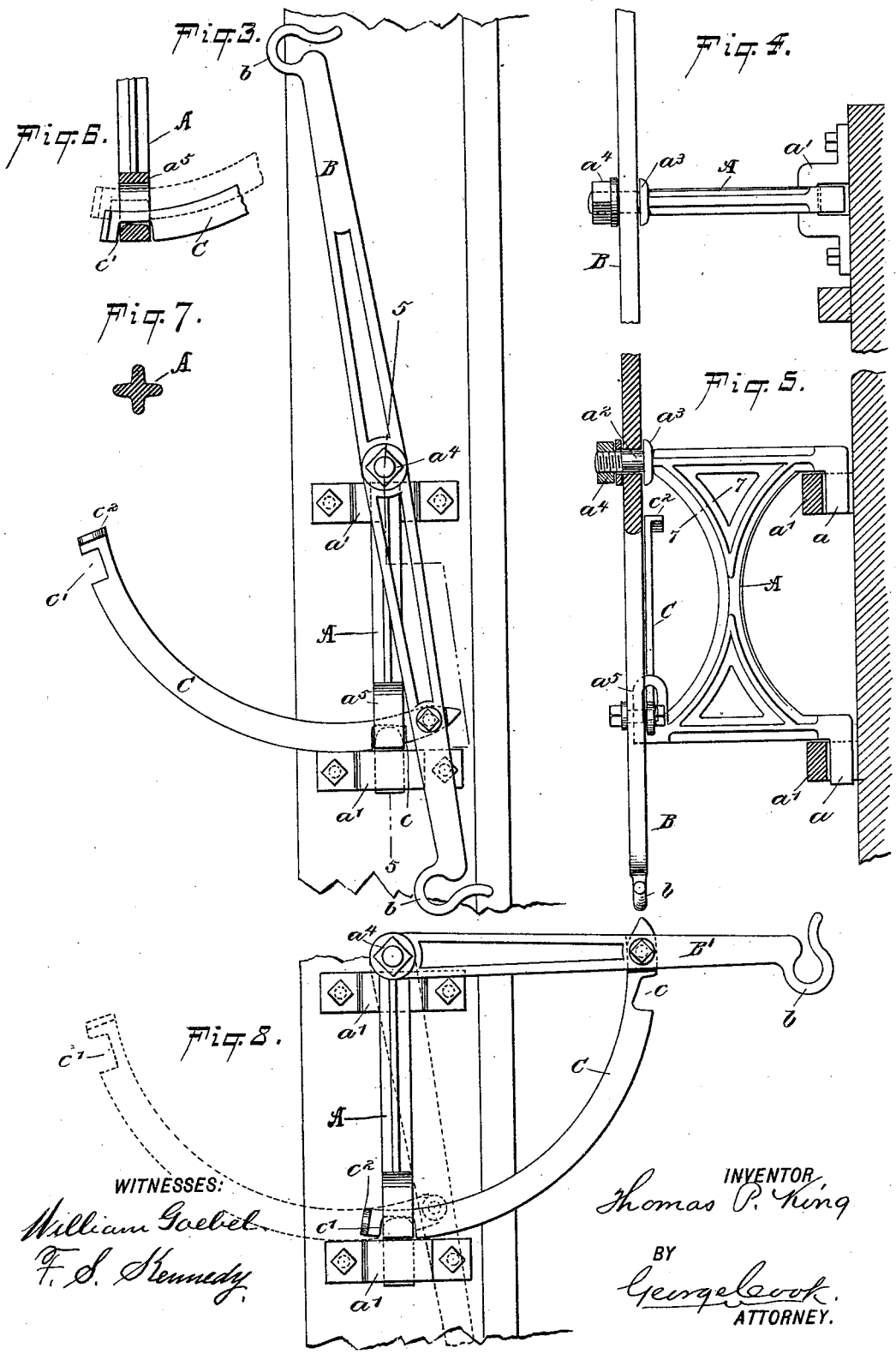

UNITED STATES PATENT OFFICE.

THOMAS P. KING, OF NEW YORK, N. Y.

CLOTHES-LINE SUPPORT.

SPECIFICATION forming part of Letters Patent No. 583,486, dated June 1, 1897.

Application filed November 14, 1894. Serial No. 528,707. (No model.)

*To all whom it may concern:*

Be it known that I, THOMAS P. KING, a citizen of the United States, and a resident of New York, in the county of New York and State of New York, have invented certain new and useful Improvements in Clothes-Line Supports, of which the following is a specification.

My invention relates to an improvement in clothes-line supports, and more particularly to that kind which are usually employed in dwelling and tenement houses, wherein one support is attached to the house or window and the other to a pole usually located in the rear end of the yard.

The object of my invention is to provide a support to be attached to the house or window, which, while the clothes are being hung upon the line or rope, is extended within the window to avoid the necessity of leaning out of the latter while so doing, and which, after the hanging of the clothes has been completed and while the line is not in use, lies wholly outside of the room, allowing the window to be closed.

With this and other ends in view my invention consists in certain novel features of construction and combinations of parts, as will be hereinafter fully described, and pointed out in the claim.

Figure 1:
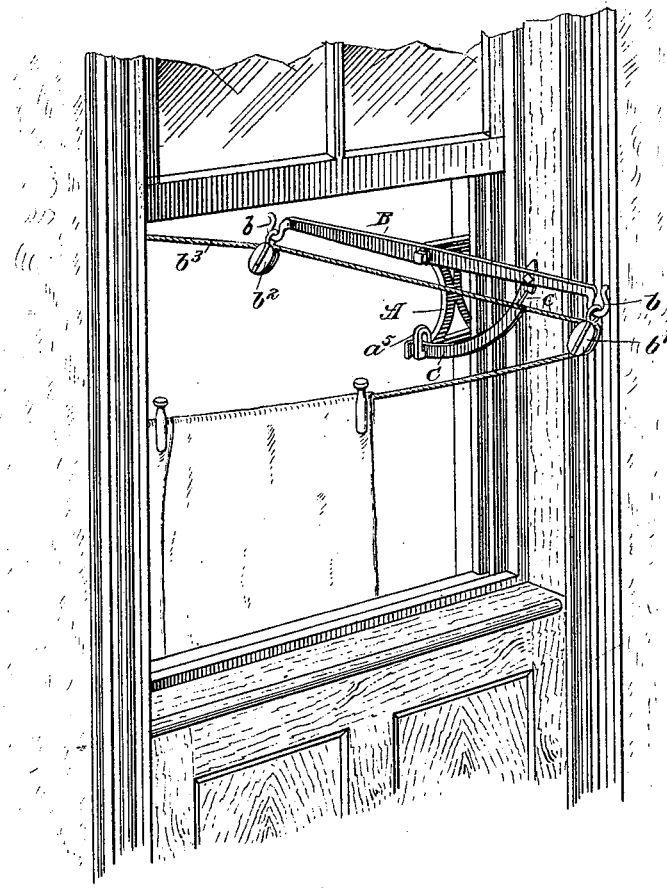
Figure 2:
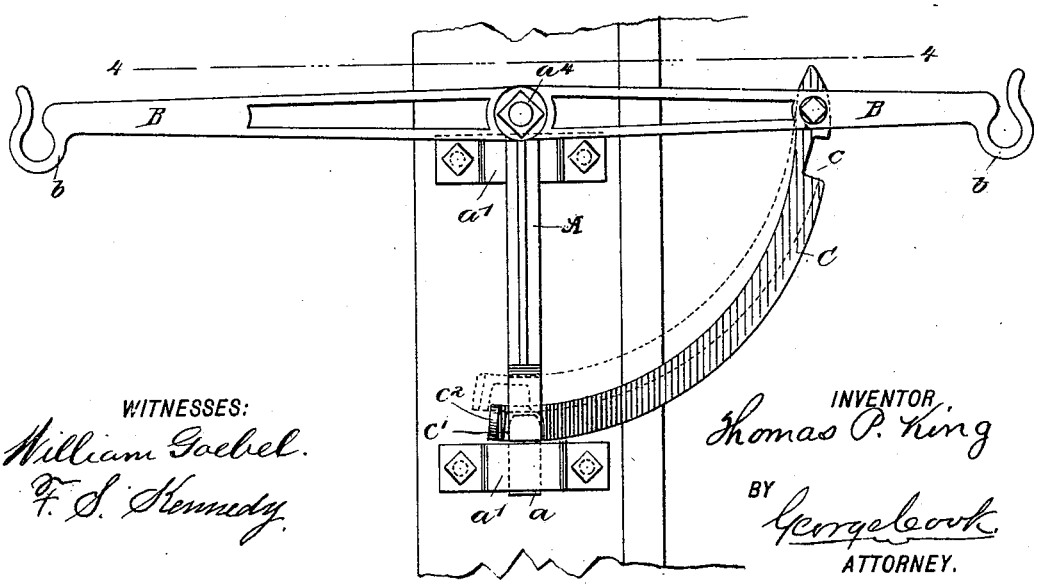

In the accompanying drawings, Figure 1 is a perspective view of my improved support attached to the house, the window being raised. Fig. 2 is a side view thereof, the pulleys and rope being removed. Fig. 3 is a similar view with the lever in its vertical adjustment. Fig. 4 is a top plan view taken on the line 4 4 of Fig. 2. Fig. 5 is a view taken on the line 5 5 of Fig. 3. Fig. 6 is detailed view. Fig. 7 is a sectional view of the bracket, taken on the line 7 7 of Fig. 5. Fig. 8 is a view of modification.

Referring to the drawings, A represents a detachable bracket, made of metal, and preferably of the shape in cross-section as shown in Fig. 7, in order to combine strength with lightness. This bracket has formed on or secured thereto the two hooks or downwardly-projecting lugs $a$, adapted to fit in the eyes or sockets $a'$ of plates secured to the building on the outside of the window. By forming these lugs and the openings in the sockets square in cross-section any swinging or lateral motion of the bracket is avoided. The upper free end of the bracket has secured thereto or formed thereon the pivotal bearing $a^2$, on which is mounted the lever B, the center thereof being provided with an opening into which said bearing fits, a shoulder $a^3$ being formed on one end of the latter and a nut $a^4$ screwed onto the opposite end for the purpose of keeping said lever in its position upon said bearings.

As shown in Fig. 1 of the drawings, each end of the rocking lever B has formed thereon or secured thereto a hook $b$, upon which are hung the pulleys $b'$ $b^2$, the supporting line or rope $b^3$ passing around said pulleys and around a similar pulley on the post located in the yard.

To the lever B and between the pivoted center thereof and the end which extends within the window when said lever is in its horizontal position is pivoted the bar C, constructed in the form of an arc of a circle and provided near its pivoted end with a recess $c$ and near its free end with a recess $c'$, said curved bar passing through an opening or loop $a^5$, formed on the lower free end of the bracket A, the extreme free end of said bar C being bent or turned, as shown at $c^2$, in order to prevent said bar from being entirely pulled out of said loop $a^5$.

When the device is not in use, it assumes the position as shown in Fig. 3, and so held by reason of the recess $c$ engaging with the loop $a^5$—that is, the lever B is in an upright position, allowing the window to be closed. When desired, however, to secure or hang clothes upon the line, the lower end of the rocking lever B is raised to extend within a window, as shown in Fig. 1, the curved bar C sliding within the loop $a^5$ until the recess $c'$ therein engages with the lower side of the loop, said curved bar C thereby holding the lever in its horizontal position. The clothes are then hung upon the line, as shown in Fig. 1, upon the lower strand or loop of the rope, and this without the necessity of leaning out of the window. The lower strand of the rope is forced outwardly as in ordinary cases, as the clothes are hung thereon, said rope passing over and around the pulleys $b'$ $b^2$. After the line is full or all of the clothes hung thereon a slight upward pressure or blow upon the bar C will raise its lower end from engagement with the loop upon the bracket, the inner end of the bar thereupon dropping by means of the weight of the clothes, the recess $c$ engaging with the loop $a^5$ and the outer end of said lever B rising and thereby taking up the slack of the rope, or, in other words, preventing any sagging of the rope which would naturally occur from the dropping or lowering of the inner end of said lever. When the lever and its several parts assume the position as shown in Fig. 3 of the drawings—that is, practically an upright position on the outside of the window—it will be evident that the window may be closed down. After the clothes have dried and are thereby necessarily lightened the window may be raised and the lower end of the lever B easily lifted or raised until the lower notched end of the curved bar C engages with the loop $a^5$ on the bracket. The parts are then in position as shown in Fig. 1, whereupon the clothes may be removed from the line in the ordinary manner and without leaning out of the window. When not in use, the lever is caused to assume its upright position in order to allow of the closing of the window, as before described.

It will be evident to any person skilled in the art that instead of having a lever B, pivoted in the middle, a lever B' may be utilized when pivoted at one end, one of the pulleys—viz., $b^2$—being dispensed with, the remainder of the device being constructed as before described. I prefer the former construction, however, as in such case all sagging of the rope is prevented, which is not the case in the above-mentioned modification. (Illustrated in Fig. 8.)

It will be understood from the above that my improved support is simple and inexpensive to manufacture, and easily, readily, and safely operated from the inside of the window, thereby obviating and overcoming all danger incident to leaning out of the latter.

Having fully described my invention, what I claim as new, and desire to secure by Letters Patent, is—

In a clothes-line support, supporting-plates adapted to be attached to the window-casing and having eyes, a detachable bracket having lugs to take into the eyes of the plates, a lever pivoted at the upper edge of the bracket, an eye formed in the lower edge of the bracket, a segmental bar connected to one arm of the lever, and having its lower end playing in the eye in the bracket, recesses in the under side of said bar for locking the same, and a lug on the end of the bar to prevent its passing through said eye.

Signed at New York, in the county of New York and State of New York, this 31st day of October, A. D. 1894.

THOMAS P. KING.

Witnesses:
F. S. KENNEDY,
GEORGE COOK.